United States Patent
Zhou et al.

(10) Patent No.: US 10,412,750 B2
(45) Date of Patent: Sep. 10, 2019

(54) METHOD AND DEVICE FOR SCHEDULING AND USING REMAINING RESOURCES OF SYNCHRONIZATION SIGNAL BLOCK

(71) Applicant: SPREADTRUM COMMUNICATIONS (SHANGHAI) CO., LTD., Shanghai (CN)

(72) Inventors: Huayu Zhou, Shanghai (CN); Weijie Xu, Shanghai (CN); Zhikun Xu, Shanghai (CN); Su Huang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 90 days.

(21) Appl. No.: 15/876,213

(22) Filed: Jan. 22, 2018

(65) Prior Publication Data

US 2018/0227935 A1 Aug. 9, 2018

(30) Foreign Application Priority Data

Feb. 4, 2017 (CN) .......................... 2017 1 0064638

(51) Int. Cl.
*H04W 72/04* (2009.01)
*H04W 72/12* (2009.01)
*H04W 56/00* (2009.01)

(52) U.S. Cl.
CPC ..... *H04W 72/1205* (2013.01); *H04W 72/1289* (2013.01); *H04W 56/00* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 2018/0124718 A1* | 5/2018 | Ng | H04B 7/15 |
| 2018/0167195 A1* | 6/2018 | Ly | H04J 11/0086 |
| 2018/0176067 A1* | 6/2018 | Luo | H04L 27/2678 |
| 2018/0199363 A1* | 7/2018 | Lee | H04L 5/0044 |
| 2019/0028984 A1* | 1/2019 | Lee | H04J 11/00 |

* cited by examiner

*Primary Examiner* — Duc T Duong
(74) *Attorney, Agent, or Firm* — Kilpatrick Townsend & Stockton, LLP (57) ABSTRACT

A method and a device for scheduling and using remaining resources of a synchronization signal block is described. The method includes configuring a mini-slot according to the remaining resources, and transmitting scheduling information for the mini-slot to a user equipment. The method further includes scheduling information that includes downlink control information for the mini-slot. Further, the remaining resources include remaining symbols left after occupation of the last synchronization signal block in a slot where the last synchronization signal block is located, when at least one synchronization signal block is transmitted.

19 Claims, 5 Drawing Sheets

METHOD AND DEVICE FOR SCHEDULING AND USING REMAINING RESOURCES OF SYNCHRONIZATION SIGNAL BLOCK

CROSS-REFERENCE TO RELATED APPLICATIONS

This application claims the benefit of priority to Chinese Patent Application No. 201710064638.5, filed on Feb. 4, 2017, the entire disclosure of which are incorporated herein by reference.

TECHNICAL FIELD

The present disclosure relates to the field of communication technology, and more particularly, to a method and a device for scheduling and using remaining resources of a synchronization signal block.

BACKGROUND

In a 5th generation mobile network system (5th-Generation, 5G), a primary synchronization signal (PSS), a secondary synchronization signal (SSS) and a physical broadcast channel (PBCH) are included in a synchronization signal block (SS-block). In an analog domain, each synchronization signal block may be seen as resources of a beam in a beam sweeping process. A plurality of synchronization signal blocks constitute a synchronization signal burst (SS-burst), and resources of the synchronization signal burst may be seen as resources transmitted in turns by a plurality of beams in the beam sweeping. A plurality of synchronization signal bursts are transmitted in turns in a time domain, and constitute a synchronization signal burst set (SS-burst-set).

For each synchronization signal block, the synchronization signal block includes at least one symbol. A number of symbols occupied by a round of continuous beam sweeping of time resources may be represent as p×N, wherein p represents a number of synchronization signal blocks corresponding to the round of continuous beam sweeping, and N represents a number of symbols included in the synchronization signal block.

However, in an existing wireless communication system, a majority of user equipment are scheduled in a time unit of a slot, and a number of the slot is fixed (for example, the number of the slot may be y). Accordingly, y−(p×N)% y remaining symbols may not be used to transmit the synchronization signal block after the beam sweeping.

At present, the remaining symbols may become idle resources that cannot be effectively used, which wastes resources.

SUMMARY

In embodiments of the present disclosure, a method and a device for scheduling and using remaining resources of a synchronization signal block are provided, to improve resource utilization.

In an embodiment of the present disclosure, a method for scheduling remaining resources of a synchronization signal block is provided, including: configuring a mini-slot according to the remaining resources; and transmitting scheduling information for the mini-slot to a user equipment, wherein the scheduling information at least includes downlink control information for the mini-slot; wherein the remaining resources includes one or more remaining symbols left after occupation of the last synchronization signal block in a slot where the last synchronization signal block is located, when at least one synchronization signal block is transmitted.

In some embodiment, the downlink control information is carried by a physical downlink control channel for the mini-slot.

In some embodiment, the physical downlink control channel for the mini-slot is predetermined in a subband where the synchronization signal block is located.

In some embodiment, the downlink control information is carried by a physical downlink control channel of the slot where the last synchronization signal block is located.

In some embodiment, the at least one synchronization signal block is continuous in time domain resource.

In some embodiment, a mini-slot is configured according to the remaining resources, including: configuring a physical downlink control channel for the mini-slot; and configuring a data channel for the mini-slot.

In some embodiment, the method further includes: transmitting an indicator to the user equipment, wherein the indicator is configured to indicate a location of the remaining resources.

In some embodiment, the indicator includes a number of the at least one synchronization signal block, or a number of the at least one synchronization signal block and a number of symbols in at least a part of synchronization signal blocks.

In some embodiment, the indicator is transmitted to the user equipment in broadcast.

In some embodiment, the indicator is transmitted to the user equipment in a dedicated control signaling.

In some embodiment, a number of symbols for the mini-slot is less than a number of symbols in the slot.

In an embodiment of the present disclosure, a device for scheduling remaining resources of a synchronization signal block is provided, including: a configuration circuitry, configured to configure a mini-slot according to the remaining resources; and a first transmission circuitry, configured to transmitting scheduling information for the mini-slot to a user equipment, wherein the scheduling information at least includes downlink control information for the mini-slot; wherein the remaining resources include: one or more remaining symbols left after occupation of the last synchronization signal block in a slot where the last synchronization signal block is located, when at least one synchronization signal block is transmitted.

In some embodiment, the downlink control information is carried by a physical downlink control channel for the mini-slot.

In some embodiment, the physical downlink control channel for the mini-slot is predetermined in a subband where the synchronization signal block is located.

In some embodiment, the downlink control information is carried by a physical downlink control channel of the slot where the last synchronization signal block is located.

In some embodiment, the at least one synchronization signal block is continuous in time domain resource.

In some embodiment, the configuration circuitry includes: a first configuration sub-circuitry, configured to configure a physical downlink control channel for the mini-slot; and a second configuration sub-circuitry, configured to configure a data channel for the mini-slot.

In some embodiment, the device further includes: a second transmission circuitry, configured to transmit an indicator to the user equipment, wherein the indicator is configured to indicate a location of the remaining resources.

In some embodiment, the indicator includes a number of the at least one synchronization signal block, or a number of the at least one synchronization signal block and a number of symbols in at least a part of synchronization signal blocks.

In some embodiment, the second transmission circuitry transmits the indicator to the user equipment in broadcast.

In some embodiment, the second transmission circuitry transmits the indicator to the user equipment in a dedicated control signaling.

In some embodiment, a number of symbols for the mini-slot is less than a number of symbols in the slot.

In an embodiment of the present disclosure, a method for using remaining resources of a synchronization signal block is provided, including: receiving scheduling information for a mini-slot from a base station, wherein the scheduling information at least includes downlink control information for the mini-slot, and the mini-slot is configured according to the remaining resources; and transmitting and/or receiving data according to the scheduling information; wherein the remaining resources include: one or more remaining symbols left after occupation of the last synchronization signal block in a slot where the last synchronization signal block is located, when at least one synchronization signal block is transmitted.

In some embodiment, the method further includes: receiving an indicator, to determine a location of the remaining resources.

In some embodiment, the method further includes: determining a physical downlink control channel according the location of the remaining resources, wherein the downlink control information is carried by the physical downlink control channel In some embodiment, the physical downlink control channel is a physical downlink control channel for the mini-slot.

In some embodiment, the physical downlink control channel for the mini-slot is predetermined in a subband where the synchronization signal block is located.

In some embodiment, the physical downlink control channel is a physical downlink control channel for a slot where the last synchronization signal block is located.

In some embodiment, the indicator includes a number of the at least one synchronization signal block, or a number of the at least one synchronization signal block and a number of symbols in at least a part of synchronization signal blocks.

In some embodiment, the at least one synchronization signal block is continuous in time domain resource.

In an embodiment of the present disclosure, a device for using remaining resources of a synchronization signal block is provided, including: a first receiving circuitry, configured to receive scheduling information for a mini-slot from a base station, wherein the scheduling information at least includes downlink control information for the mini-slot, and the mini-slot is configured according to the remaining resources; a response circuitry, configured to transmit and/or receive data according to the scheduling information; wherein the remaining resources include: one or more remaining symbols left after occupation of the last synchronization signal block in a slot where the last synchronization signal block is located, when at least one synchronization signal block is transmitted.

In some embodiment, the device further includes: a second receiving circuitry, configured to receive an indicator, to determine a location of the remaining resources.

In some embodiment, the device further includes: a determination circuitry, configured to determine a physical downlink control channel according the location of the remaining resources, wherein the downlink control information is carried by the physical downlink control channel.

In some embodiment, the physical downlink control channel is a physical downlink control channel for the mini-slot.

In some embodiment, the physical downlink control channel for the mini-slot is predetermined in a subband where the synchronization signal block is located.

In some embodiment, the physical downlink control channel is a physical downlink control channel for a slot where the last synchronization signal block is located.

In some embodiment, the indicator includes a number of the at least one synchronization signal block, or a number of the at least one synchronization signal block and a number of symbols in at least a part of synchronization signal blocks.

In some embodiment, the at least one synchronization signal block is continuous in time domain resource.

A mini-slot is configured according to the remaining resources and scheduling information for the mini-slot is transmitted to a user equipment, wherein the remaining resources include: one or more remaining symbols left after occupation of the last synchronization signal block in a slot where the last synchronization signal block is located, when at least one synchronization signal block is transmitted. Compared with the prior art that remaining resources may not be utilized effectively after the synchronization signal block is transmitted, in embodiments of the present disclosure, scheduling information transmitted to the user equipment includes a downlink control information for the mini-slot, so that the user equipment may transmit data using the mini-slot, and the remaining resources may be utilized effectively, to improve utilization of resources and avoid a waste of resources.

Further, after reviving scheduling information for the mini-slot from a base station, the user equipment may transmit and/or receive data according to downlink control information for the mini-slot included in the scheduling information.

Further, the user equipment further receives an indicator, to determine a location of the remaining resource, and further determines a physical downlink control channel, to receive downlink control information carried in the mini-slot of the physical downlink control channel.

DETAILED DESCRIPTION

After the transmission of the synchronization signal block between a base station and a user equipment is completed, if remaining resources still exist, the remaining resources will be idle resources and may not be effectively utilized based on the existing technology. For example, the base station continuously transmits 20 symbols of a synchronization signal block to the user equipment this time, and the user equipment is scheduled in a time unit of a slot with a length of 14 symbols for each slot. Therefore, the transmission occupies 2 slots, and only the first six symbols in the latter slot are configured to transmit the synchronization signal block. After the transmission of the current synchronization signal block is completed, in the latter slot, the 8 symbols starting from the $7^{th}$ symbol may be referred as remaining resources of the synchronization signal block. The remaining resources are in idle state and may not be effectively used based on the existing technology.

In embodiments of the present disclosure, a mini-slot is configured according to the remaining resources, and scheduling information for the mini-slot is transmitted to a user equipment, wherein the remaining resources include: one or more remaining symbols left after occupation of the last synchronization signal block in a slot where the last synchronization signal block is located, when at least one synchronization signal block is transmitted. Embodiments of the present disclosure, scheduling information transmitted to the user equipment includes downlink control information for the mini-slot, so that the user equipment may transmit data using the mini-slot, and the remaining resources may be utilized effectively, to improve utilization of resources and avoid waste of resources.

Embodiments of the present disclosure are described in detail with reference to the drawings.

Figure 1:
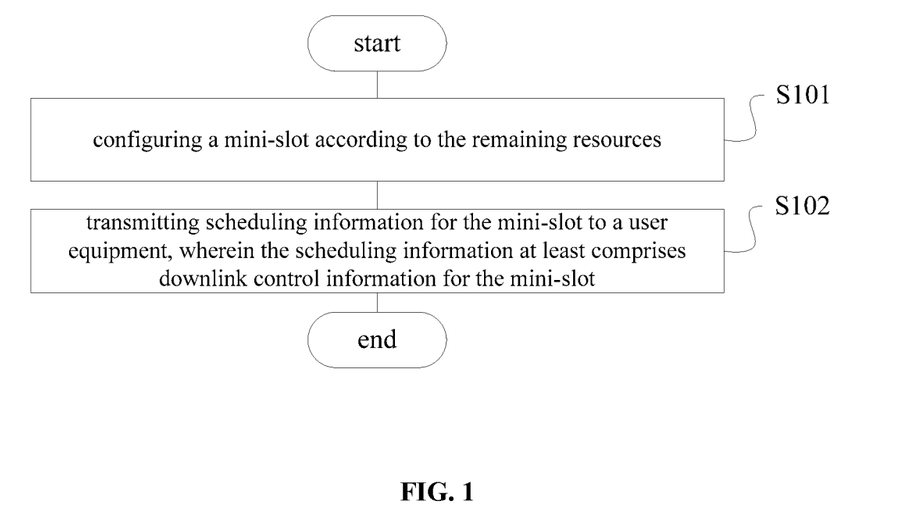
FIG. 1 schematically illustrates a flow diagram of a method for scheduling remaining resources according to an embodiment of the present disclosure.

FIG. 1 schematically illustrates a flow diagram of a method for scheduling remaining resources according to an embodiment of the present disclosure. At least one synchronization signal block is transmitted by one or more slots, wherein the remaining resources include: one or more remaining symbols left after occupation of the last synchronization signal block in a slot where the last synchronization signal block is located, when at least one synchronization signal block is transmitted.

In one embodiment, in S101, a mini-slot is configured according to the remaining resources. In another embodiment, the mini-slot is configured to provide the user equipment with resources for data exchange with the base station. In some embodiment, a number of symbols for the mini-slot is less than a number of symbols in the slot, wherein the slot may indicate a slot where the last synchronization signal block is located. In an embodiment, after transmitting the synchronization signal block, the base station transmits the mini-slot in a subband where the synchronization signal block is located, so that the user equipment uses resources for the mini-slot. In some embodiment, the user equipment may be user equipment that receiving the synchronization signal block.

Thereafter, in S102, scheduling information for the mini-slot is transmitted to the user equipment, wherein the scheduling information at least includes downlink control information for the mini-slot. Specially, downlink control information (namely New Radio Downlink Control Information, NR-DCI) for the mini-slot is configured to authorize the user equipment to receive and/or transmit data using resources in the mini-slot, to improve utilization of remaining resources. In one embodiment, the scheduling information is configured to inform the user equipment that the resource to be scheduled this time is the remaining resources.

Further, the downlink control information is carried by a physical downlink control channel (namely New Radio Physical Downlink Control Channel, NR-PDCCH), wherein the physical downlink control channel for the mini-slot is predetermined in a subband where the synchronization signal block is located. For example, the physical downlink control channel for the mini-slot may occupy the first few symbols for the mini-slot. In one embodiment, a position of physical downlink control channel for the mini-slot may be predetermined by the base station and the user equipment. For example, the user equipment may detect a key parameter that is predetermined with the base station in advance, so that the user equipment determines whether the scheduling information indicates the physical downlink control channel for the mini-slot, and further receives the downlink control information by detecting (or monitoring) the physical downlink control channel.

In some embodiment, the downlink control information may further be carried by the physical downlink control channel in a slot where the last synchronization signal block is located. For example, the base station may predetermine with the user equipment that: when the base station transmits the predetermined scheduling information at a predetermined position of the physical downlink control channel in the slot, the user equipment may know that the base station specially configures the last 4 symbols in the slot as mini-slots.

Further, a bandwidth of the subband may be greater than or equal to a bandwidth of the synchronization signal block.

Further, the at least one synchronization signal block may occupy one or more slots. In a typical application scenario, with reference to the schematic diagram of the remaining resources shown in FIG. 2, the base station transmits multiple synchronization signal blocks 22 to the user equipment, and the multiple synchronization signal blocks 22 may occupy multiple slots 21 (a number of the multiple slots 21 is not shown in FIG. 2). In the slot 21 where the last synchronization signal block 22 is located, a plurality of symbols (not shown in FIG. 2) is unoccupied after the last synchronization signal block 22. In some embodiment, the base station may use all of the plurality of symbols as the remaining resources 23 and as a mini-slot 25, and configure one or more symbols starting from a start position of the mini-slot 23 as the physical control channel 24 for the mini-slot.

Figure 2:
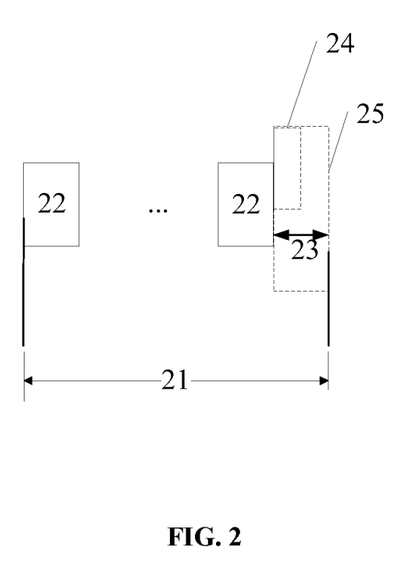
FIG. 2 schematically illustrates a diagram of remaining resource according to an embodiment of the present disclosure.

In some embodiment, the start position of the mini-slot 25 may be any symbol included in the remaining resources 23. For example, as shown in FIG. 2, the start position may be from the first symbol in the remaining resources 23, or may be from the third symbol of the remaining resources 23.

Further, the at least one synchronization signal block is continuous in time domain resource. For example, in the schematic diagram shown in FIG. 2, there is no null symbol in the at least one synchronization signal block 22 or no symbol in the at least one synchronization signal block 22 used for other data transmission.

In some embodiment, the at least one synchronization signal block may further be discontinuous in a time domain. Accordingly, for null symbols occurred discontinuously, when the null symbols are not configured to transmit other data, the base station may configure the mini-slot based on the technical solution in embodiments of the present disclosure, so that the user equipment transmits data to improve resource utilization.

Further, the synchronization signal block may further include symbol resources occupied by a common control channel. In some embodiment, the common control channel is similar to the synchronization signal block, and may also be broadcast in a beam sweeping manner.

Further, the S101 includes: configuring a physical downlink control channel for the mini-slot; and configuring a data channel for the mini-slot. In a non-limiting embodiment, with reference to the schematic diagram shown in FIG. 2, the first 4 symbols in the mini-slot 25 may be configured as the physical downlink control channel 24 for the mini-slot, and remaining symbols in the mini-slot 25 other than the first 4 symbols are configured as the data channel (not shown in the figure).

In some embodiment, the scheduling method may further include: transmitting an indicator to the user equipment, wherein the indicator is configured to indicate a location of the remaining resources, and the user equipment may determine the timing to monitor the physical downlink control channel according to the indicator. For example, the user equipment scheduled with the remaining resources may not be the user equipment that receives the synchronization signal block, and the user equipment scheduled with the remaining resources needs to determine the location of the remaining resources according to the indicator, to use the remaining resources.

In some embodiment, the indicator may include a number of the at least one synchronization signal block. For example, if each of the at least one synchronization signal block includes the same number of symbols and is known by the user equipment in advance. According to the start position of the at least one synchronization signal block, the at least one synchronization signal block, and a number of symbols included in each synchronization signal block, the user equipment may determine the location of the remaining resources. In some embodiment, the position of the remaining resources may be expressed based on a formula $t1+p \times N$, wherein t1 is a start position of the at least one synchronization signal block, and p us a number of the at least one synchronization signal block, and N is the number of symbols included in each synchronization signal block.

In some embodiment, the indicator may further include a number of the at least one synchronization signal block and a number of symbols in at least a part of synchronization signal blocks. For an example, the number of symbols included in the last synchronization signal block in the at least one synchronization signal block is specially designed. For another example, a part of synchronization signal blocks in the at least one synchronization signal block may include different numbers of symbols from other synchronization signal blocks. Compared with the calculation manner in the previous embodiment, in some embodiment, the base station indicates to the user equipment a number of synchronization signal block with different numbers of symbols included in the at least one synchronization signal block and the number of symbols included in the synchronization signal block with different numbers of symbols, so that the user equipment combines the start position of the synchronization signal block to determine the location of the remaining resources.

Further, the number of the at least one synchronization signal block and number of symbols included in at least a part of synchronization signal blocks may have a K possible combination predetermined by the base station and the user equipment, so that the indicator may only be configured to indicate which combination of the K possible combinations is for a particular number of the at least one synchronization signal block and a particular number of symbols included in at least a part of synchronization signal blocks this time. In one embodiment, in this situation, the indicator may be expressed by log 2(K) bits, so that bits occupied by the indicator may be greatly saved.

In some embodiment, the number of the at least synchronization signal block and the number of symbol included in at least a part of synchronization signal blocks may be predetermined by the base station and the user equipment.

The base may not transmit the indicator, and the user equipment may determine the position of the remaining resources according to a particular parameter.

Further, the indicator may be transmitted to the user equipment simultaneously or before or after the scheduling information.

Further, the indicator may be transmitted to the user equipment in a broadcast manner. For example, the indicator is transmitted to the user equipment in a broadcast manner through a broadcast channel or a common control channel. In one embodiment, when the base station transmits the indicator in a broadcast manner, the indicator may be received by the user equipment whether in an idle state or in a connected state. Thus, the user equipment in the idle state is allowed to use the remaining resources.

In some embodiment, the indicator may further be transmitted to the user equipment in a dedicated control signaling. For example, the base station may transmit the indicator through a radio resource control (RRC) signaling. In one embodiment, compared with the previous technical solution of transmitting the indicator by broadcasting, in some embodiment, only the user equipment in the connected state is allowed to receive the indicator, so that resources of channels of the broadcast types is saved.

From above, in some embodiment, the remaining resources of the synchronization signal block may be reasonably utilized to improve utilization of resources and to avoid a waste of resources.

Figure 3:
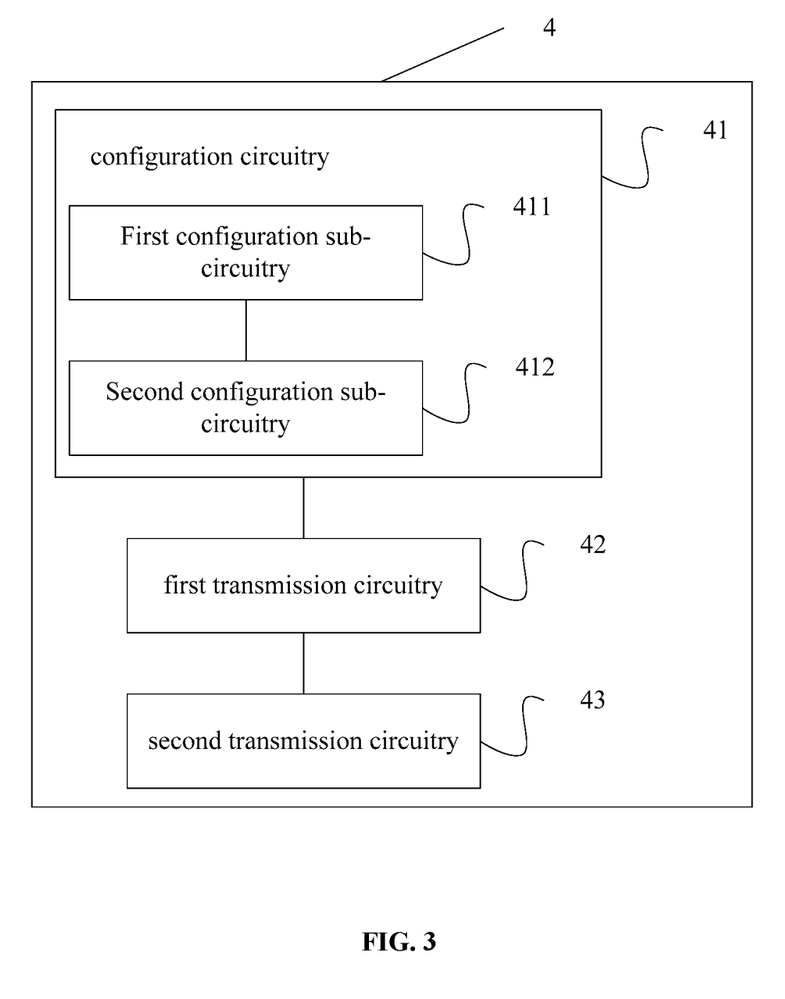
FIG. 3 schematically illustrates a structural diagram of a device for scheduling remaining resources according to an embodiment of the present disclosure.

FIG. 3 schematically illustrates a structural diagram of a device for scheduling remaining resources according to an embodiment of the present disclosure. In one embodiment, the scheduling device 4 is configured to implement the technical solution of the method described in embodiments shown in FIG. 1 and FIG. 2. In some embodiment, the scheduling device 4 includes a configuration circuitry 41, configured to configure a mini-slot according to the remaining resources; a first transmission circuitry 42, configured to transmitting scheduling information for the mini-slot to a user equipment, wherein the scheduling information at least includes downlink control information for the mini-slot; wherein the remaining resources include: one or more remaining symbols left after occupation of the last synchronization signal block in a slot where the last synchronization signal block is located, when at least one synchronization signal block is transmitted.

Further, the downlink control information is carried by a physical downlink control channel for the mini-slot.

In some embodiment, the physical downlink control channel for the mini-slot is predetermined in a subband where the synchronization signal block is located.

In some embodiment, the downlink control information is carried by a physical downlink control channel of the slot where the last synchronization signal block is located.

Further, the at least one synchronization signal block is continuous in time domain resource.

Further, the configuration circuitry 41 includes: a first configuration sub-circuitry 411, configured to configure a physical downlink control channel for the mini-slot; and a second configuration sub-circuitry 412, configured to configure a data channel for the mini-slot.

Further, the device 4 further includes: a second transmission circuitry 43, configured to transmit an indicator to the user equipment, wherein the indicator is configured to indicate a location of the remaining resources.

In some embodiment, the indicator includes a number of the at least one synchronization signal block, or a number of the at least one synchronization signal block and a number of symbols in at least a part of synchronization signal blocks.

Further, the second transmission circuitry 43 transmits the indicator to the user equipment in broadcast.

In some embodiment, the second transmission circuitry 43 transmits the indicator to the user equipment in a dedicated control signaling.

Further, a number of symbols for the mini-slot is less than a number of symbols in the slot.

More details of principles and manners about the scheduling device 4 may be referred to the description shown in FIG. 1 and FIG. 3, and are not described here.

Figure 4:
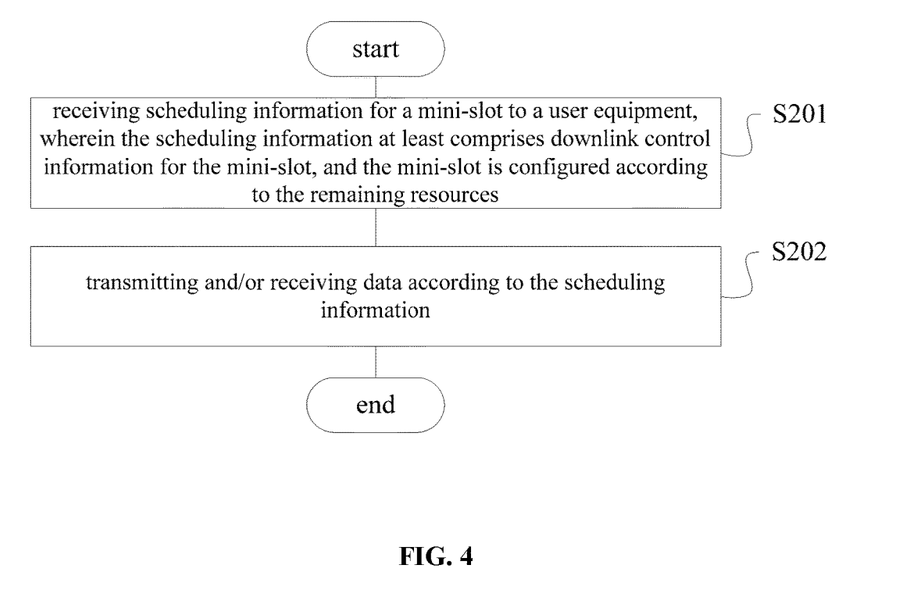
FIG. 4 schematically illustrates a flow diagram of a method for using remaining resources according to an embodiment of the present disclosure.

FIG. 4 schematically illustrates a flow diagram of a method for using remaining resources according to an embodiment of the present disclosure. The remaining resources include: one or more remaining symbols left after occupation of the last synchronization signal block in a slot where the last synchronization signal block is located, when at least one synchronization signal block is transmitted. In one embodiment, reference may be made to the related description of the remaining resources in embodiments shown in FIG. 1 and FIG. 2, and the details are not described here.

In one embodiment, in S201, scheduling information for a mini-slot is received from a base station, wherein the scheduling information at least comprises downlink control information for the mini-slot, and the mini-slot is configured according to the remaining resources. In some embodiment, the user equipment determines the scheduled resources are the remaining resources according to the downlink control information. In one embodiment, the specific process that the base station configures the mini-slot according to the remaining resources. In one embodiment, referring to the specific process that the base station configures the mini-slot according to the remaining resources, reference may be made to technical solutions in embodiments shown in FIG. 1 and FIG. 2, and the details are not described here.

In S202, data is transmitted and/or received according the scheduling information. In one embodiment, the user equipment transmits data by using a data channel in the mini-slot according to the indication of the scheduling information.

Further, the user equipment may also receive an indicator, to determine a location of the remaining resources. For example, the user equipment determines the scheduled resources are the remaining resource according to the scheduling information, so that the user equipment may receive the indicator from the base station, to determine the location of the remaining resources.

In an application scenario, after transmitting the at least one synchronization signal block, the base station configures all of symbols after the last synchronization signal block in the slot where the last synchronization signal block is located as the mini-slot, and configures downlink control information corresponding to the mini-slot, and a physical downlink control channel for the mini-slot and a data channel for mini-slot. Then, the base station transmits the scheduling information to the user equipment, to inform the user equipment that scheduled resources are the remaining resources. Further, the base station transmits the physical downlink control channel for the mini-slot, and transmits the downlink control information in the physical downlink control channel for the mini-slot, and also transmits the data channel. Further, the base station transmits the indicator to the user equipment, to indicate the location of the remaining resources.

After receiving the scheduling information and the indicator, the user equipment determines the location of the remaining resources based on the indicator, and determines and receives the physical downlink control channel for the mini-slot according to the location of the remaining resources, to detect downlink control information for the mini-slot carried on the downlink control channel. If the downlink control information indicates that the mini-slot is scheduled to be used by the user equipment, the user equipment receives and/or transmits data at a location of response resources according to the downlink control information.

In some embodiment, the physical downlink control channel is a physical downlink control channel for the mini-slot. For example, the physical downlink control channel for the mini-slot is predetermined in a subband where the synchronization signal block is located. In some embodiment, the physical downlink control channel is a physical downlink control channel for a slot where the last synchronization signal block is located.

Further, the indicator includes a number of the at least one synchronization signal block. The user equipment may determine the location of the remaining resources according to a start position of the at least one synchronization signal block, a number of the at least synchronization signal block and a number of symbols included in each synchronization signal block. In some embodiment, the indicator includes a number of the at least one synchronization signal block and a number of symbols included at least one synchronization signal block. Further, the at least one synchronization signal block is temporarily continuous.

From the above, in some embodiment, after receiving scheduling information for the mini-slot from the base station, the user equipment may transmit and/or receive data according to downlink control information for the mini-slot included in scheduling information. Further, the user equipment also receives the indicator, to determine the location of the remaining resources, so that the user equipment determines the physical downlink control channel, to receive downlink control information for the mini-slot included in the physical downlink control channel. In one embodiment, the base station allows the authorized user equipment to use the remaining resources of the synchronization signal block through scheduling information and the indicator, to improve resources utilization and avoid a waste of resources.

Figure 5:
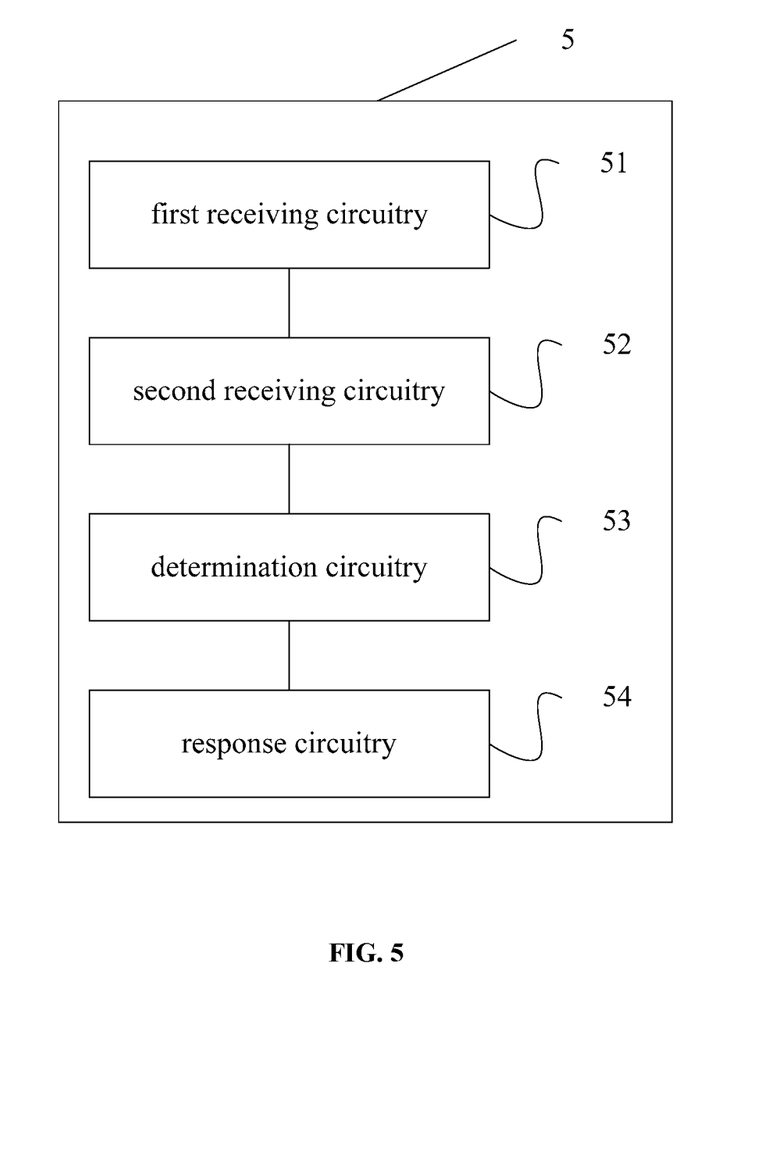
FIG. 5 schematically illustrates a structural diagram of a device for using remaining resources according to an embodiment of the present disclosure.

FIG. 5 schematically illustrates a structural diagram of a device for using remaining resources according to an embodiment of the present disclosure. In one embodiment, the using device 5 in the embodiment is configured to implement the technical solutions of the method shown in FIG. 4. In one embodiment, in some embodiment, the using device 5 includes: a first receiving circuitry 51, configured to receive scheduling information for a mini-slot from a base station, wherein the scheduling information at least comprises downlink control information for the mini-slot, and the mini-slot is configured according to the remaining resources; a response circuitry 54, configured to transmit and/or receive data according to the scheduling information; wherein the remaining resources comprise: one or more remaining symbols left after occupation of the last synchronization signal block in a slot where the last synchronization signal block is located, when at least one synchronization signal block is transmitted.

Further, the device 5 includes a second receiving circuitry 52, configured to receive an indicator, to determine a location of the remaining resources.

Further, the device 5 includes a determination circuitry 53, configured to determine a physical downlink control channel according the location of the remaining resources, wherein the downlink control information is carried by the physical downlink control channel.

Further, the physical downlink control channel is a physical downlink control channel for the mini-slot.

In some embodiment, the physical downlink control channel for the mini-slot is predetermined in a subband where the synchronization signal block is located.

In some embodiment, the physical downlink control channel is a physical downlink control channel for a slot where the last synchronization signal block is located.

Further, the indicator comprises a number of the at least one synchronization signal block, or a number of the at least one synchronization signal block and a number of symbols in at least a part of synchronization signal blocks.

Further, the at least one synchronization signal block is continuous in time domain resource.

In one embodiment, in order to distinguish different cells and different synchronization signal beams, the initial value of a pseudorandom sequence for the demodulation reference signal is configured to relate to the cell identity and the synchronization signal beam identity. The synchronization signal beam identity is also referred to as a synchronization signal block index, which leads to the interference randomization between the demodulation reference signals between different cells or different beams. After receiving the demodulation reference signal, the user equipment distinguishes different cells and different synchronization signal beams, in order to conduct a time and frequency synchronization (namely time and frequency tracking).

Further, the user equipment conducts a frequency domain autocorrelation on a channel estimated according to the demodulation reference signal, to obtain time synchronization; and the user equipment conducts a time domain autocorrelation on the channel estimated according to the demodulation reference signal, to obtain frequency synchronization.

All or part of steps of above methods may be completed by relevant hardware once the program instruction are executed, and the program may be storage in a computer readable storage medium, such as a Read-Only memory (ROM), a Random Access Memory (RAM), a magnetic disk or an optical disk.

What is claimed is:

1. A method comprising:
   configuring a mini-slot according to remaining resources of a synchronization signal block; and
   transmitting scheduling information for the mini-slot to a user equipment,
      wherein the scheduling information at least comprises downlink control information for the mini-slot;
      wherein the remaining resources comprise: one or more remaining symbols left after occupation of a last synchronization signal block in a slot where the last synchronization signal block is located, when at least one synchronization signal block is transmitted.

2. The method according to claim 1, wherein the downlink control information is carried by a physical downlink control channel for the mini-slot.

3. The method according to claim 2, wherein the physical downlink control channel for the mini-slot is predetermined in a subband where the synchronization signal block is located.

4. The method according to claim 1, wherein the downlink control information is carried by a physical downlink control channel of the slot where the last synchronization signal block is located.

5. The method according to claim 1, wherein the at least one synchronization signal block is continuous in time domain resource.

6. The method according to claim 1, wherein configuring a mini-slot according to the remaining resources comprises:
   configuring a physical downlink control channel for the mini-slot; and
   configuring a data channel for the mini-slot.

7. The method according to claim 1, further comprising:
   transmitting an indicator to the user equipment, wherein the indicator is configured to indicate a location of the remaining resources.

8. The method according to claim 7, wherein the indicator comprises a number of the at least one synchronization signal block, or a number of the at least one synchronization signal block and a number of symbols in at least a part of synchronization signal blocks.

9. The method according to claim 7, wherein the indicator is transmitted to the user equipment in broadcast.

10. The method according to claim 7, wherein the indicator is transmitted to the user equipment in a dedicated control signaling.

11. The method according to claim 1, wherein a number of symbols for the mini-slot is less than a number of symbols in the slot.

12. A method comprising:
   receiving scheduling information for a mini-slot from a base station, wherein the scheduling information at least comprises downlink control information for the mini-slot, and the mini-slot is configured according to remaining resources of a synchronization signal block; and
   transmitting and/or receiving data according to the scheduling information,
   wherein the remaining resources comprise: one or more remaining symbols left after occupation of the last synchronization signal block in a slot where the last synchronization signal block is located, when at least one synchronization signal block is transmitted.

13. The method according to claim 12, further comprising:
   receiving an indicator, to determine a location of the remaining resources.

14. The method according to claim 13, further comprising:
   determining a physical downlink control channel according the location of the remaining resources, wherein the downlink control information is carried by the physical downlink control channel.

15. The method according to claim 14, wherein the physical downlink control channel is a physical downlink control channel for the mini-slot.

16. The method according to claim 15, wherein the physical downlink control channel for the mini-slot is predetermined in a subband where the synchronization signal block is located.

17. The method according to claim 14, wherein the physical downlink control channel is a physical downlink control channel for a slot where the last synchronization signal block is located.

18. The method according to claim 13, wherein the indicator comprises a number of the at least one synchronization signal block, or a number of the at least one synchronization signal block and a number of symbols in at least a part of synchronization signal blocks.

19. The method according to claim 12, wherein the at least one synchronization signal block is continuous in time domain resource.

* * * * *